(12) United States Patent
Dixon et al.

(10) Patent No.: US 8,943,517 B2
(45) Date of Patent: Jan. 27, 2015

(54) GENERALIZED APPLICATION MESSAGE GENERATION SERVICE

(71) Applicant: International Business Machines Corporation, Armonk, NY (US)

(72) Inventors: Bret W. Dixon, South Perth (AU); Scot W. Dixon, South Perth (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/772,742

(22) Filed: Feb. 21, 2013

(65) Prior Publication Data

US 2014/0237484 A1    Aug. 21, 2014

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 9/54 | (2006.01) | |

(52) U.S. Cl.
CPC ..................................... *G06F 9/54* (2013.01)
USPC ........................................................ 719/313

(58) Field of Classification Search
None
See application file for complete search history.

(56) References Cited

U.S. PATENT DOCUMENTS

| 7,571,429 | B2 | 8/2009 | Dathathraya et al. | |
| 7,900,094 | B2 | 3/2011 | Marinucci | |
| 7,937,360 | B2 | 5/2011 | Hazlewood et al. | |
| 8,359,603 | B1 * | 1/2013 | McCann et al. | 719/312 |
| 2007/0044011 | A1 * | 2/2007 | Cottrille et al. | 715/511 |
| 2008/0126363 | A1 * | 5/2008 | Isobe | 707/10 |
| 2008/0215581 | A1 * | 9/2008 | Messing et al. | 707/6 |
| 2008/0281850 | A1 | 11/2008 | Schoning | |
| 2010/0049693 | A1 * | 2/2010 | Cao et al. | 707/2 |
| 2010/0100371 | A1 | 4/2010 | Yuezhong et al. | |
| 2010/0306083 | A1 * | 12/2010 | Oren | 705/27 |
| 2010/0325540 | A1 | 12/2010 | Biazetti et al. | |

OTHER PUBLICATIONS

IBM, Error messages with unique identifiers, Abstract for Technical Disclosure No. IPCOM000014412D, Jun. 16, 2001, pp. 1-2, IP.com, Published online at: http://ip.com/IPCOM/000014412.

* cited by examiner

*Primary Examiner* — Hyung S. Sough
*Assistant Examiner* — William C Wood
(74) *Attorney, Agent, or Firm* — Lee Law, PLLC; Christopher B. Lee

(57) ABSTRACT

A message generation request is received from an application using a message generation application programming interface (MG API) at a message generation service (MGS) device. The message generation request includes a request for the MGS to generate a message on behalf of the application and includes message generation parameters passed by the application using the MG API. A distributable message is generated on behalf of the application according to the message generation parameters passed by the application using the MG API and a message file. The message file includes at least one template message construct usable to generate the distributable message. The distributable message is distributed, on behalf of the application, to a resource as requested.

20 Claims, 8 Drawing Sheets

600

GENERALIZED APPLICATION MESSAGE GENERATION SERVICE

BACKGROUND

The present invention relates to application message generation. More particularly, the present invention relates to a generalized application message generation service.

Computer applications may be written to execute on a variety of platforms. Developers write these applications using a variety of programming languages and development environments. Applications may be programmed by developers for a variety of purposes. Applications may process inputs and generate outputs. Applications may also generate information and send the information to other systems. Similarly, applications may receive information from other systems and process the information.

BRIEF SUMMARY

A method includes receiving, via a message generation application programming interface (MG API) at a message generation service (MGS) device, a message generation request from an application, where the message generation request comprises a request for the MGS to generate a message on behalf of the application and comprises message generation parameters passed by the application using the MG API; generating a distributable message on behalf of the application according to the message generation parameters passed by the application using the MG API and a message file that comprises at least one template message construct usable to generate the distributable message; and distributing the distributable message as requested on behalf of the application to a resource.

A system includes a memory and a processor, operable at a message generation service (MGS), programmed to: receive, via a message generation application programming interface (MG API), a message generation request from an application, where the message generation request comprises a request for the MGS to generate a message on behalf of the application and comprises message generation parameters passed by the application using the MG API; generate, within the memory, a distributable message on behalf of the application according to the message generation parameters passed by the application using the MG API and a message file that comprises at least one template message construct usable to generate the distributable message; and distribute the distributable message as requested on behalf of the application to a resource.

A computer program product includes a computer readable storage medium having computer readable program code embodied therewith, where the computer readable program code when executed on a computer causes the computer to: receive, via a message generation application programming interface (MG API) at a message generation service (MGS), a message generation request from an application, where the message generation request comprises a request for the MGS to generate a message on behalf of the application and comprises message generation parameters passed by the application using the MG API; generate a distributable message on behalf of the application according to the message generation parameters passed by the application using the MG API and a message file that comprises at least one template message construct usable to generate the distributable message; and distribute the distributable message as requested on behalf of the application to a resource.

DETAILED DESCRIPTION

Figure 1:
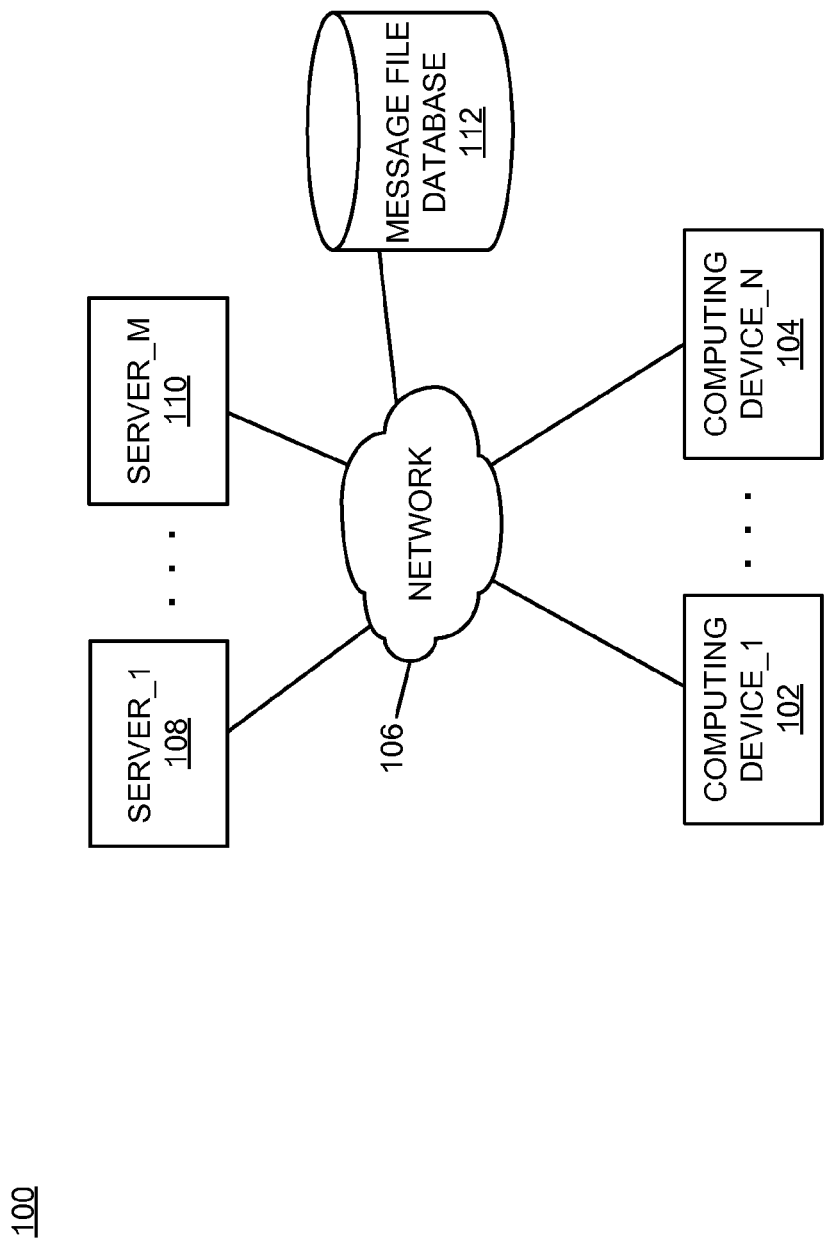
FIG. 1 is a block diagram of an example of an implementation of a system for a generalized application message generation service according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides a generalized application message generation service. The present technology provides a client/server message generation service that allows applications to disassociate themselves from conventional message generation processes (e.g., built-in routines and local resources). Application run-time message generation is performed using a client/server message transformation and distribution service (hereinafter message generation service or MGS). A message generation request may be received from an application by the MGS via a message generation application programming interface (MG API). The message generation request represents a request for the MGS to generate messages on behalf of the application and may include message generation parameters passed by the application using the MG API. The MGS generates a distributable message on behalf of the application according to the parameters passed by the applications using the MG API and one or more message files that include template message constructs. The distributable message is distributed as requested on behalf of the application to a resource.

As such, the location of the message generation service is disassociated from the application, along with the ultimate destination(s) of the generated messages. The run-time message generation service processes requests from multiple concurrent applications, transforms the messages as appropriate, and distributes the messages to their respective remote resources. The message generation service generates and distributes messages on behalf of applications to one or more local and remote destinations (alternatively "resources") based upon specified message generation parameters (e.g., destination, etc.) or default message generation parameters. The local or remote locations/resources may include log files, consoles, event processing services, applications, mobile devices, and other devices/components as appropriate for a given implementation. Accordingly, application messaging may be improved based upon the present technology by providing a generalized application message generation service, as described in more detail below. The term "messages" as utilized herein includes any of a variety of application event records, such as informational event records, warning event records, error event records, critical event records, alert event records, diagnostic event records, and trace event records.

The present technology introduces a common interface that may be exploited by multiple applications running locally or remotely with respect to the message generation service, and further provides flexibility in message generation and distribution throughout one or more systems. The present subject matter further expands application message generation service to developing technology areas such as multi-device computing and mobile computing. For example, application message generation may be provided as a service that may be deployed in a multi-device computing and mobile computing environment. The application message generation may be exploited by multiple participating applications and services. As an additional example, in the mobile technology area, the present subject matter provides an approach for mobile client applications to log messages on a remote system where the messages may be used for diagnostic or other purposes (e.g., to log error and diagnostic messages rather than logging on the client/mobile device).

The present technology provides three new components that may be used to implement the generalized application message generation service described herein. The components include a message generation application programming interface (MG API), a message generation service (MGS), and a message file/database. Applications may use the MG API to issue message generation requests to the MGS. The MG API receives multiple parameters from applications and manages token substitution into the run-time message content.

The MGS may be running locally or remotely to the applications. The MGS uses the message file and the template message constructs of the message file to format and distribute messages according to parameters passed by applications via the MG API and according to MGS defaults. The template message constructs may include message text interspersed with place holders for substitution of message elements that are variable. For example, a return code or process name that varies from message instance to message instance may be configured using template message constructs. As such, the message file or message file database may include message texts (e.g., templates) and parameters associated with message identifiers that applications may use when issuing message generation requests.

The MG API represents a callable service available to applications and services that builds a data request based on input parameters. The MG API passes the request to the MGS using an available network protocol, as appropriate for a given implementation.

The MGS represents a server that accepts application requests that are issued via the MG API. The MGS formats and distributes messages according to the parameters passed by the application via the MG API. The MGS may format and distribute messages using default parameters in the absence of parameters being received with the application requests. Defaults in this context may represent, for example, default destinations based on one or more application identifiers (IDs) (e.g., source and/or destination), or other default configuration parameters as appropriate for a given implementation. Defaults may take the form of configuration settings local to the MGS.

The application may pass a complete message as a parameter and the MGS may use this complete message to distribute the message unchanged to the destination(s) indicated by MGS defaults or further parameters passed by the application via the MG API. Alternatively, applications may pass a message identifier plus optional substitution values and distribution destinations. The MGS may use the message identifier to locate an associated message text in the message file. The MGS may further format the message before distributing it according to distribution defaults or additional parameters passed by the application via the MG API. The formatting may include substitution of message values, natural language translation, insertion of additional text, additional messages, color, and/or font modification. Message text and other optional parameters may also be passed by the application via the MG API, and MGS message formatting defaults may be configured.

It should be noted that the message file may be natural language-specific (e.g., English, French, Spanish, Chinese, Japanese languages, etc.) or may include message texts for multiple natural languages, as appropriate for a given implementation. When natural language-specific, the MGS may use a selected message file relevant to the language associated with the MG API request.

The MG API may operate synchronously or asynchronously. If the MG API is synchronous, the application may wait in response to a request for a reply to be received from the MGS. Within a synchronous implementation, the MGS may report success or failure for delivery of the request back to the application that is waiting for a reply to be received from the MGS, again via the selected network protocol for the implementation.

It should be noted that the present technology is extendable, in that message formatting and distribution may be extended as appropriate for the given implementation. Additionally, such extensions may be utilized by applications without change to the applications by the use of MGS defaults, or may be utilized by programmatic modification through MG API parameters.

It should be noted that conception of the present subject matter resulted from recognition of certain limitations associated with application messaging environments. For example, it was observed that while applications and services may be developed that produce diagnostic and error messages, these functions form part of the software code base, and are not usable externally. Consequently, it was observed that application and service developers must write their own specific functions for their particular needs with regard to message generation. It was further observed that, while certain services provide functions, such as message catalogue routines, that may be used by software applications and services for message generation, these functions are compiled and linked into the application or service. Further, these services are limited in their function (e.g., only able to retrieve a message text from a message file based on a message identifier as input) and are limited to the resources available on the system where they run. It was additionally observed that, while some services allow an error condition and/or associated diagnostics to be forwarded to a remote collector, such services do not provide a record for the user of the software application. In view of these observations, it was determined that application and service users need a record of software failures for problem determination and resolution, and need control over where these records are delivered. It was additionally observed that duplicated development efforts for messaging and incompatibilities of developed messaging code (e.g., messaging code for multiple languages, such as English, French, Spanish, Chinese, Japanese languages, etc.) result from the many varied approaches to and target platforms for application message generation. In view of this additional observation, it was determined that a client/server message generation service was needed for applications that allows applications to disassociate themselves from conventional message generation processes (e.g., built-in routines and local resources), and that generates and distributes messages to multiple local and remote destinations (e.g., log files, consoles, event processing services, applications, mobile devices, and other devices/components as appropriate for a given implementation) based upon specified message generation parameters (e.g., destination, etc.) or default message generation parameters. As such, the present subject matter improves application messaging by providing a generalized application message generation service, as described above and in more detail below. As such, improved application messaging may be obtained by use of the present technology.

The generalized application message generation service described herein may be performed in real time to allow prompt messaging and message generation/distribution control by users of computing systems. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for a generalized application message generation service. A computing device_1 102 through a computing device_N 104 communicate via a network 106 with several other devices. The other devices include a server_1 108 through a server_M 110.

A message file database 112 stores message text (e.g., message templates). The message file database 112 may store message text/templates as natural language-specific text (e.g., English, French, Spanish, Chinese, Japanese languages, etc.) or may store message texts for multiple natural languages, as appropriate for a given implementation. It should be noted that the message file database 112 is illustrated as a single device for ease of illustration purposes. However, as also described in more detail below, the message file database 112 may be replicated, distributed, and/or federated in its entirety or partially throughout the system 100 or across the respective devices within the system 100.

As will be described in more detail below in association with FIG. 2 through FIG. 8, the computing device_1 102 through the computing device_N 104 and the server_1 108 through the server_M 110 may each implement and provide or utilize the automated generalized application message generation service described herein. The automated generalized application message generation service is based upon implementation of a messaging service that introduces a common interface that may be exploited by multiple applications running locally or remotely with respect to the message generation service. As such, the present technology may be implemented at a user computing device or server device level. A variety of possibilities exist for implementation of the present subject matter, and all such possibilities are considered within the scope of the present subject matter. The examples described below provide an overview of optional implementations, but are not intended to limit implementation to the examples provided.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
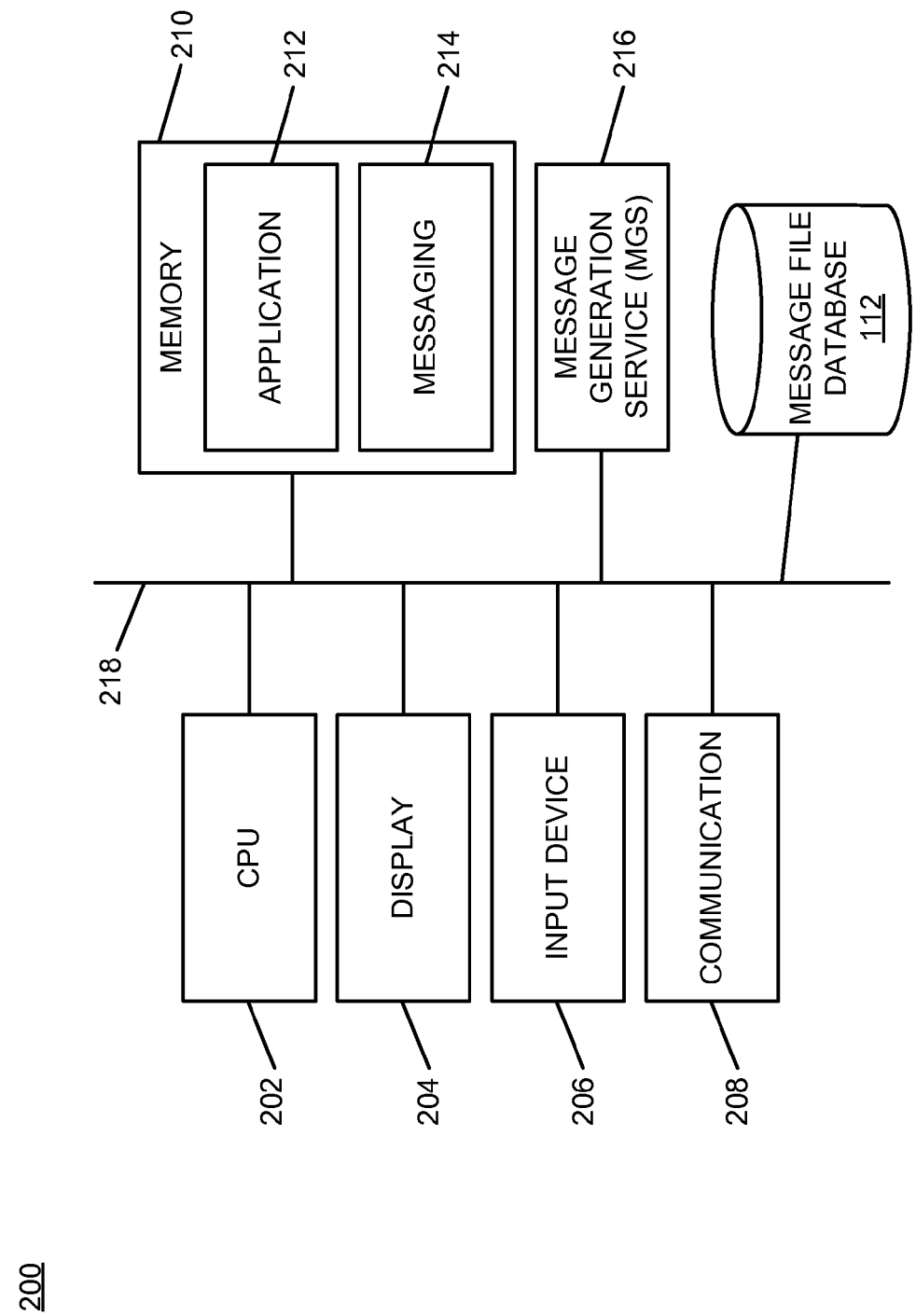
FIG. 2 is a block diagram of an example of an implementation of a core processing module capable of implementing a generalized application message generation service according to an embodiment of the present subject matter.

FIG. 2 is a block diagram of an example of an implementation of a core processing module 200 capable of implementing a generalized application message generation service. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of the generalized application message generation service in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes an application area 212 that provides storage and execution space for one or more applications within the core processing module 200. As will be described in more detail below, the applications stored and executed within the application area 212 may include a message generation application programming interface (MG API) and may utilize the generalized application message generation service described herein for either local or remote messaging.

A messaging storage area 214 may be used to store messaging requests and messaging responses generated by or for delivery to the applications within the application area 212. The messaging storage area 214 may provide storage to support the MG API used for the generalized application message generation service described herein. As such, the messaging storage area 214 may provide storage for one or more event queues, one or more message queues, and parameters associated with the MG API, or other information as appropriate for a given implementation.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A message generation service (MGS) module 216 is also illustrated. The MGS module 216 provides a common messaging interface for all applications within the system 100, whether local or remote to a particular implementation of the core processing module 200, as described above and in more detail below. The MGS module 216 implements the automated generalized application message generation service of the core processing module 200. It is understood that the MGS module 216 may be implemented as a distributed or federated component across several implementations of the core processing module 200, as described in more detail below.

It should also be noted that the MGS module 216 may form a portion of other circuitry described without departure from the scope of the present subject matter. Further, the MGS module 216 may alternatively be implemented as an application stored within the memory 210. In such an implementation, the MGS module 216 may include instructions executed by the CPU 202 for performing the functionality described herein. The CPU 202 may execute these instructions to provide the processing capabilities described above and in more detail below for the core processing module 200. The MGS module 216 may form a portion of an interrupt service routine (ISR), a portion of an operating system, a portion of a browser application, or a portion of a separate application without departure from the scope of the present subject matter.

The message file database 112 is also shown associated with the core processing module 200 within FIG. 2 to show that the message file database 112 may be coupled to the core processing module 200 without requiring external connectivity, such as via the network 106. Additionally, as described above, the message file database 112 may be replicated, distributed, and/or federated in its entirety or partially throughout the system 100 or across the respective devices that implement the core processing module 200 within the system 100.

The CPU 202, the display 204, the input device 206, the communication module 208, the memory 210, the MGS module 216, and the message file database 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the message file database 112 is illustrated as a separate component for purposes of example, the information stored within the message file database 112 may also/alternatively be stored within the memory 210 without departure from the scope of the present subject matter. Accordingly, the core processing module 200 may take many forms and may be associated with many platforms.

Figure 3:
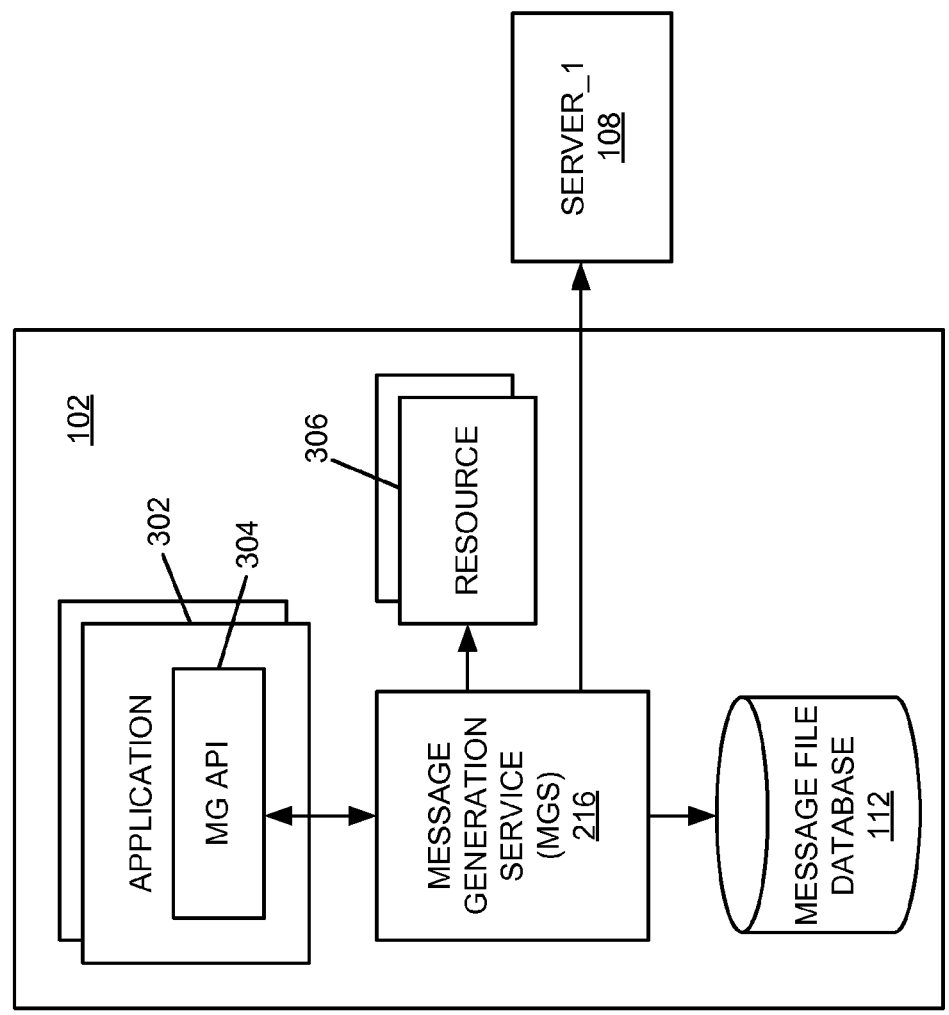
FIG. 3 is a block diagram of an example of an implementation of a generalized application message generation service with one or more applications running on a node local to a message generation service (MGS) according to an embodiment of the present subject matter.
Figure 4:
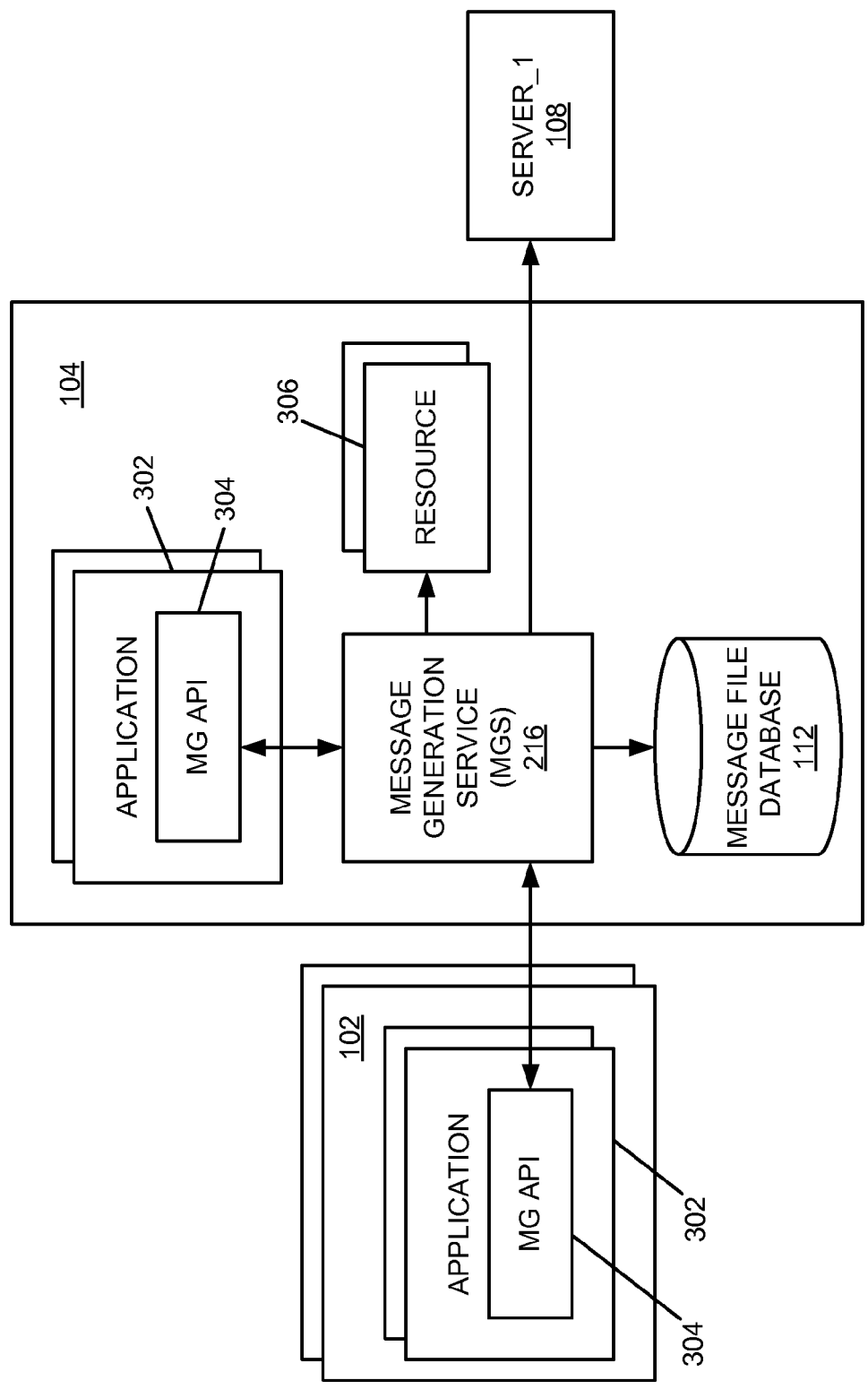
FIG. 4 is a block diagram of an example of an implementation of a generalized application message generation service with application(s) running remotely relative to a message generation service (MGS) according to an embodiment of the present subject matter.
Figure 5:
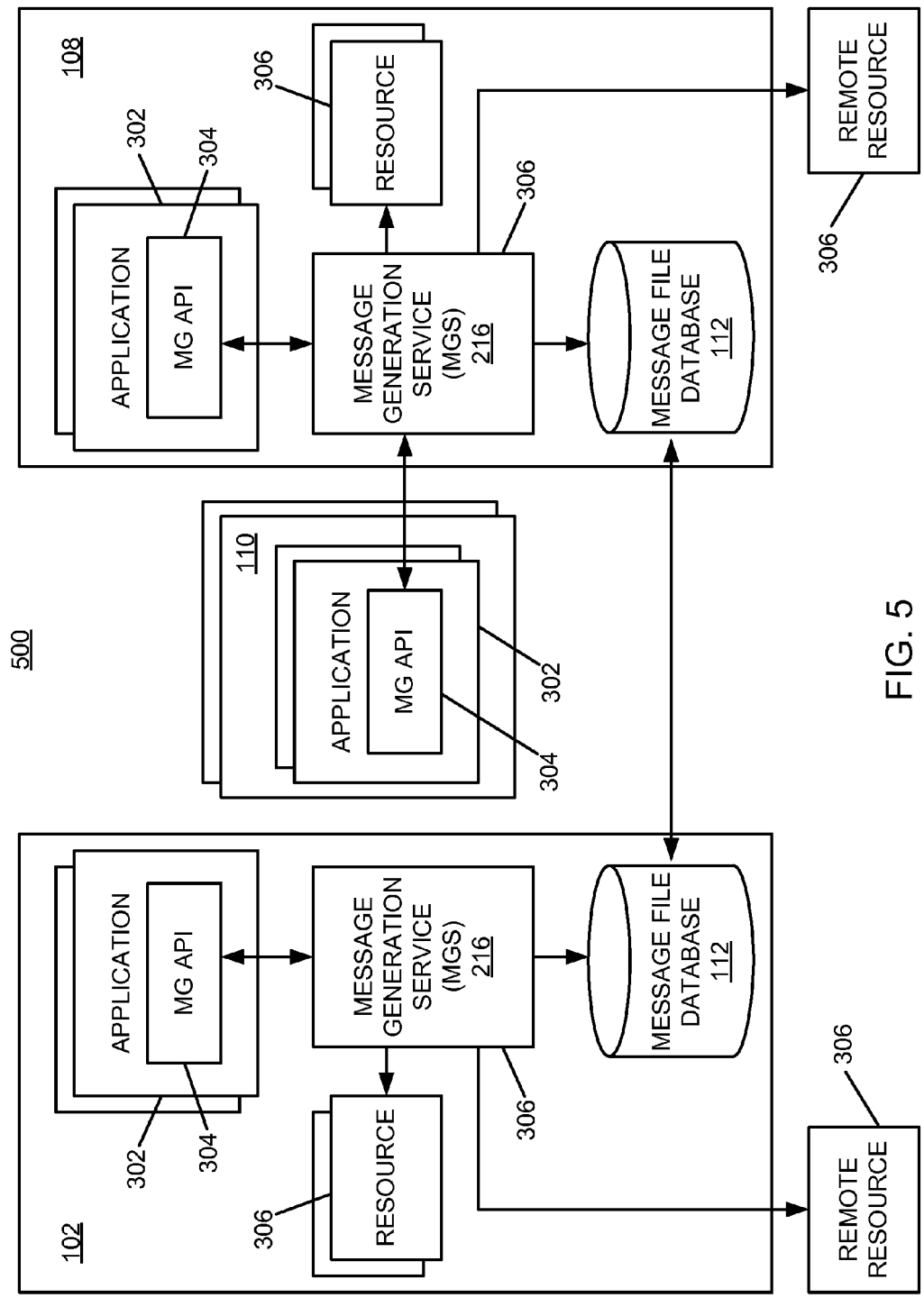
FIG. 5 is a block diagram of an example of an implementation of a generalized application message generation service with a message generation service (MGS) federated across multiple devices according to an embodiment of the present subject matter.

FIG. 3 through FIG. 5 described below represent example architectural implementations for generalized application message generation service associated within a system, such as the system 100. It is understood that many variations on the examples described within FIG. 3 through FIG. 5 are possible and all such variations are considered to be within the scope of the present subject matter. Within FIG. 3 through FIG. 5, references to memory areas within the memory 210 are omitted to reduce crowding within the drawings. However, it is understood that the respective elements described above as being stored or storable within a memory are understood to be stored within the memory 210. Additionally, as described above, the message file database 112 may be replicated, distributed, and/or federated as a separate device or within the memory 210 of different core processing modules, as appropriate for the given implementation. As described above, it should be noted that the present technology is extendable, in that message formatting and distribution may be extended as appropriate for the given implementation. Additionally, such extensions may be utilized by applications without change to the applications by the use of MGS defaults, or may be utilized by programmatic modification through MG API parameters. Within the following examples, like reference numerals will be utilized to reference similar elements (e.g., applications) to avoid repetition within the figure descriptions.

FIG. 3 is a block diagram 300 of an example of an implementation of a generalized application message generation service with one or more applications running on a node local to the message generation service (MGS) module 216. The present example utilizes the computing device_1 102 interacting with the server_1 108 for purposes of illustration. However, it is understood that the following example applies equally to any other combination of devices within the system 100.

An applications 302 represents one or more applications that may utilize a local message generation (MG) API 304 to issue requests to the MGS module 216 to generate messages. The MGS module 216 in turn accepts the application requests and processes them according to parameters passed by the application via the MG API 304, to generate and distribute the messages as requested. The MGS module 216 uses the message file database 112, which as described above, associates message identifiers (passed via the MG API) with message records in the message file database 112. The message records are then used to generate distributable message(s). A resource 306 represents one or more resources to which the distributable message(s) may be sent may be local or remote, and may include, for example, a combination of a log files, consoles, event processing services, applications, mobile devices, and other resource as appropriate for a given implementation. The server_1 108 is also illustrated as one possible example resource (e.g., a remote resource) to which the distributable message(s) may be sent.

FIG. 4 is a block diagram 400 of an example of an implementation of a generalized application message generation service with application(s) 302 running remotely relative to the MGS module 216. It should be noted that any number of applications, local and remote, may be supported by the present technology as appropriate for the given implementation. The present example utilizes the computing device_1 102, the computing device_N 104, and the server_1 108 for purposes of illustration. However, it is again understood that the following example applies equally to any other combination of devices within the system 100.

Within the present example, applications residing on the computing device_1 102, the computing device_N 104, and the server_1 108 may utilize the MGS module 216 to send messages to one another. As can be seen from FIG. 4, the MGS module 216 may be executed by one device and support message requests from multiple other devices.

FIG. 5 is a block diagram 500 of an example of an implementation of a generalized application message generation service with the MGS module 216 federated across multiple devices. For purposes of the present description, the term "federated" may represent identification of areas of usage of features, and distribution of support for those features close to (or at) the respective devices to reduce network traffic. Further, the federation may be migrated between devices over time as messaging levels between applications change, to further refine the federated implementations of the present technology.

It should again be noted that any number of applications, local and remote, may be supported by the present technology as appropriate for the given implementation. The present example utilizes the computing device_1 102, the server_1 108, and the server_M 110 for purposes of illustration. However, it is again understood that the following example applies equally to any other combination of devices within the system 100.

It should further be noted that, as can be seen from FIG. 5, the MGS module 216 is federated between the computing device_1 102 and the server_1 108. Additionally, the message file database 112 is federated between the computing device_1 102 and the server_1 108. As such, both the MGS module 216 and the message file database 112 are federated within the present example. However, as described above, many possible variations for implementation of the present technology exist, and all such variations are considered to be within the scope of the present technology. It should further be noted that additional resources 306 are illustrated in association with each of the computing device_1 102 and the server_1 108, but it is noted that additional resources 306 may be implemented in association with the server_M 110 or any other device as appropriate for a given implementation.

As such, the examples of FIG. 3 through FIG. 5 show several architectural alternatives for disassociating message generation processes from applications. The present technology may be utilized, for example, to improve application maintenance as technology and underlying network/communication protocols change. By use of the present technology, applications may be developed to utilize the MG API 304 without changes based upon communications technological advancement, and the MGS module 216 may be modified to accommodate communications technology changes.

Figure 6:
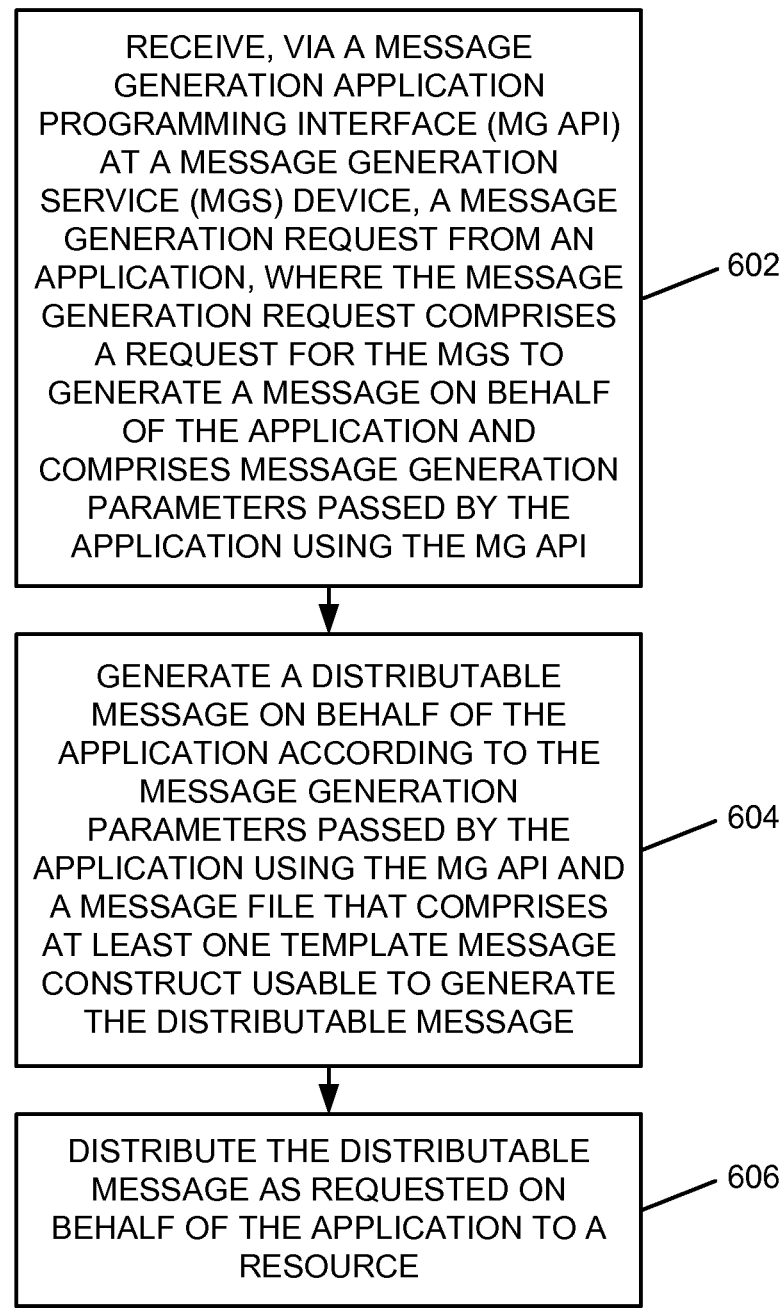
FIG. 6 is a flow chart of an example of an implementation of a process for a generalized application message generation service according to an embodiment of the present subject matter.
Figure 7:
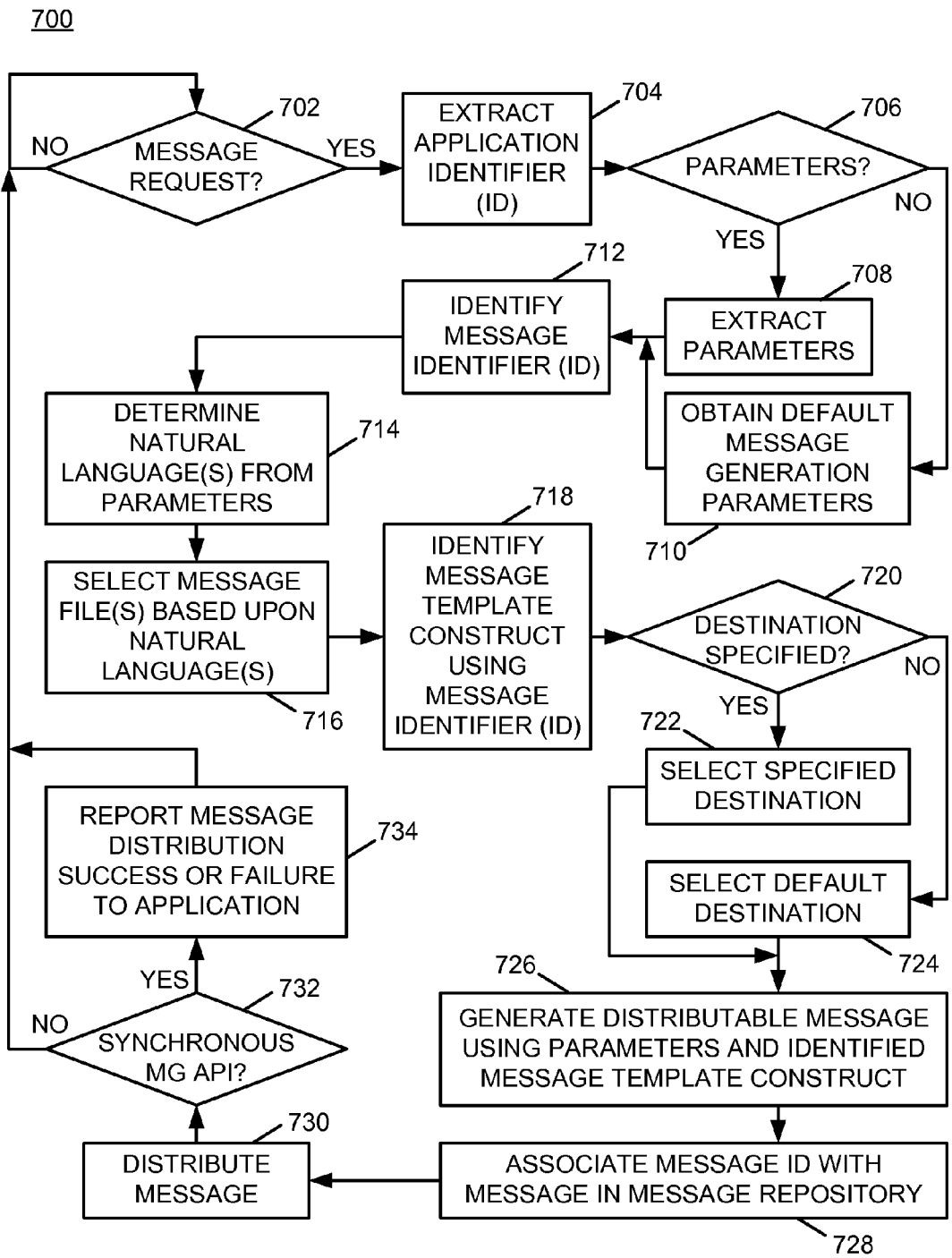
FIG. 7 is a flow chart of an example of an implementation of a process for providing a generalized application message generation service at a computing device according to an embodiment of the present subject matter.
Figure 8:
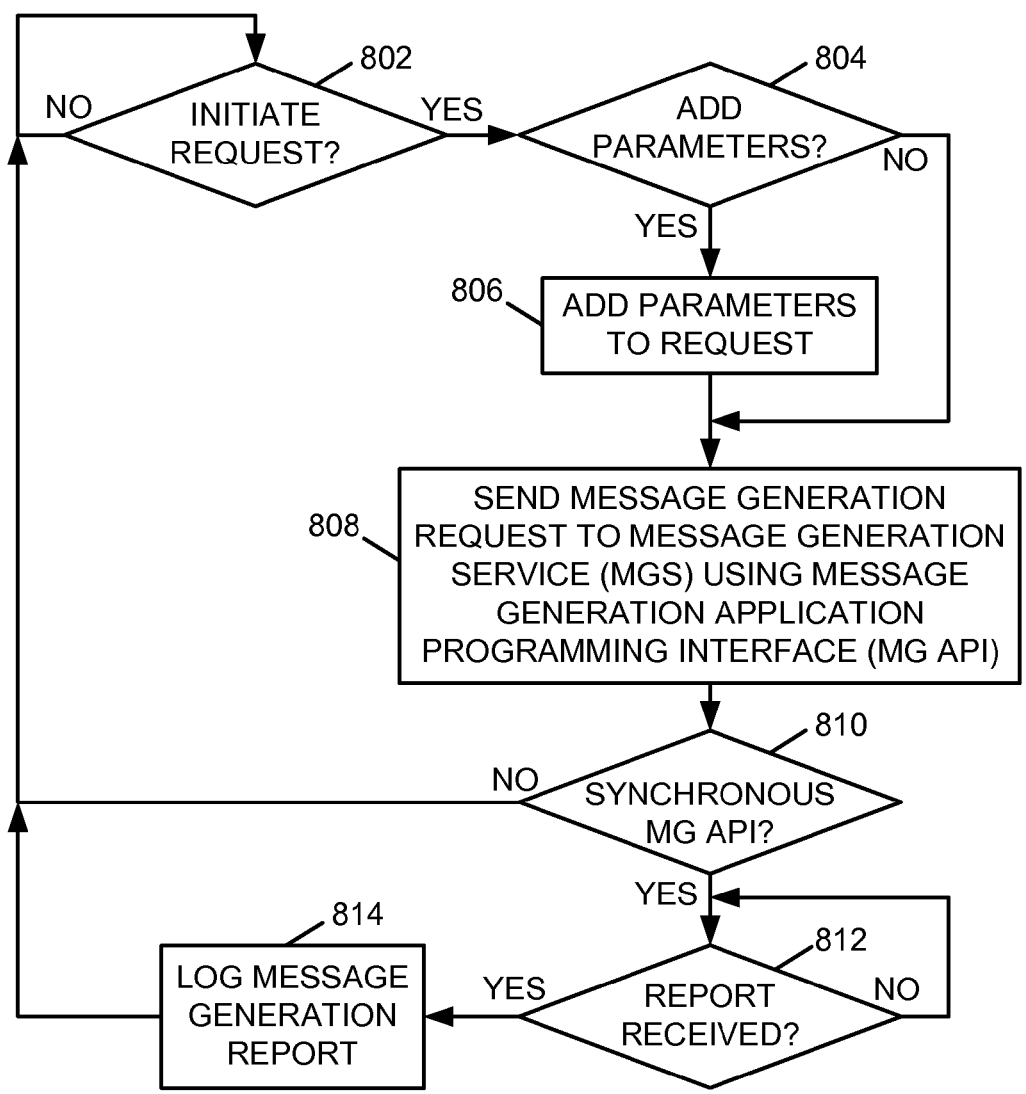
FIG. 8 is a flow chart of an example of an implementation of a process for application processing to utilize a generalized application message generation service according to an embodiment of the present subject matter.

FIG. 6 through FIG. 8 described below represent example processes that may be executed by devices, such as the core processing module 200, to perform the generalized application message generation service associated with the present subject matter. Many other variations on the example processes are possible and all are considered within the scope of the present subject matter. The example processes may be performed by modules, such as the MGS module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 600 for a generalized application message generation service. At block 602, the process 600 receives, via a message generation application programming interface (MG API) at a message generation service (MGS) device, a message generation request from an application, where the message generation request comprises a request for the MGS to generate a message on behalf of the application and comprises message generation parameters passed by the application using the MG API. At block 604, the process 600 generates a distributable message on behalf of the application according to the message generation parameters passed by the application using the MG API and a message file that comprises at least one template message construct usable to generate the distributable message. At block 606, the process 600 distributes the distributable message as requested on behalf of the application to a resource.

FIG. 7 is a flow chart of an example of an implementation of a process 700 for providing a generalized application message generation service at a computing device. The process 700 may be executed as described above by a variety of devices, and the processing described below may additionally be federated or otherwise distributed as described above. At decision point 702, the process 700 makes a determination as to whether a message generation request has been detected from an application via a message generation application programming interface (MP API) at a message generation service (MGS) device. In response to determining that a message generation request has been detected from an application via a message generation API, the process 700 extracts an application identifier (ID) from the message generation request at block 704. The application ID may be utilized to identify template message constructs and to report message generation request results back to the requesting application, and for other purposes as appropriate for a given implementation.

At decision point 706, the process 700 makes a determination as to whether message generation parameters were passed via the MG API by the application (and received via the MG API with the message generation request) that are usable to construct a distributable message on behalf of the application. As described above, default parameters may be utilized in the absence of message generation parameters being passed by the application with the message generation request. As such, message generation configurations/profiles may be established for message generation on behalf of applications at an MGS device or within a message file database, such as the message file database 112, so that parameters do not have to be included with each message generation request. Use of configured default parameters may expedite message generation request creation by applications and message generation request processing by MGS devices. The appropriate message generation configurations/profiles may be selected, for example, using the application ID associated with the message generation request.

In response to determining at decision point 706 that message generation parameters were passed via the MG API by the application (and received via the MG API with the message generation request) that are usable to construct a distributable message on behalf of the application, the process 700 extracts the message generation parameters passed by the application using the MG API from the request at block 708. The message generation parameters may additionally include a destination resource for the message and other information, such as one or more natural language selections, or other information as appropriate for a given implementation.

Alternatively, in response to determining at decision point 706 that message generation parameters were not passed via the MG API by the application (and not received via the MG API with the message generation request) that are usable to construct a distributable message on behalf of the application, the process 700 obtains default message generation parameters usable to generate the message on behalf of the application at block 710. The default message generation parameters may include a default destination identified using an application identifier of the application (e.g., from a message file database or otherwise) from an associated set of defaults in a configuration associated with the message generation service (MGS).

In response to either extracting the message generation parameters at block 708, or in response to obtaining the default message generation parameters at block 710, the process 700 identifies a message identifier specified by the application or the default message generation parameters for the application at block 712. The message identifier may be included as one of the message generation parameters passed by the application using the MG API or configured within the default message generation parameters for the application.

At block 714, the process 700 determines a natural language selection from the message generation parameters. As described above, the application ID may be utilized to identify template message constructs for generation of messages on behalf of requesting applications. The template message constructs may be stored in a message file database such as the message file database 112, and may include at least one natural language-specific template message constructs. The template message constructs may also include multiple natural-language template message constructs usable to construct messages on behalf of applications in multiple natural languages to allow translation or transformation of messages to multiple natural languages on behalf of applications.

At block 716, the process 700 selects at least one message file, such as from the message file database 112, based upon the determined natural language(s). At block 718, the process 700 identifies at least one template message construct within the message file. The template message constructs in the selected message files may include one or more natural language-specific template message constructs usable to generate the distributable message on behalf of the application in one or more natural languages.

At decision point 720, the process 700 determines whether a destination for the message was specified in the message generation parameters passed by the application using the MG API. For example, the message generation parameters passed by the application using the MG API may include at least one substitution value that includes a distribution destination for the distributable message.

In response to determining that the destination for the message was specified in the message generation parameters passed by the application using the MG API, the process 700 selects the specified destination at block 722. In response to determining that the destination for the message was not specified in the message generation parameters passed by the application using the MG API, the process 700 selects a configured default destination at block 724.

In response to either selecting the specified destination at block 722, or in response to selecting a configured default destination at block 724, the process 700 generates, at block 726, a distributable message on behalf of the application according to the message generation parameters passed by the application using the MG API (or default parameters for any message generation parameter) and at least one message file that, as described above, includes at least one template message construct usable to generate the distributable message. The generated message may be identified using a message identifier (ID) passed via the MG API with the message generation request as one of the message generation parameters by the application, or using a default message identifier, as appropriate for a given implementation. The message ID may be used to monitor message generation or used for responses to the application, as also appropriate for a given implementation. At block 728, the process 700 associates the message identifier (ID) in the request with a message record in a message repository, such as the message file database 112.

At block 730, the process 700 distributes the distributable message, as requested on behalf of the application, to a resource. As described above, the resource may include local or remote locations/resources that may include log files, consoles, event processing services, other applications, mobile devices, and other devices/components as appropriate for a given implementation. Further, where the message generation parameters passed by the application using the MG API include a substitution value that includes a distribution destination for the distributable message, the process 700 may distribute the distributable message as requested on behalf of the application to a resource at a destination specified by a substitution value within the message generation request.

It should be noted that applications may specify within the message generation parameters whether the MG API is requested to be synchronous or asynchronous for any message generation request. As such, the synchronous or asynchronous nature of the MG API may be specified and/or changed for each message generation request, as appropriate for a given message and/or implementation. Further, where the MG API operates synchronously, the application may wait for a response to the message generation request via the MG API from the MGS.

Accordingly, at decision point 732, the process 700 makes a determination as to whether the MG API is synchronous or asynchronous for the message generation request associated with the distributable message. In response to determining that the MG API is synchronous for the message generation request associated with the distributable message, the process 700 reports to the application, via the MGS, one of success and failure of distribution of the distributable message generated on behalf of the application as requested via the message generation request at block 734.

In response to either reporting to the application, via the MGS, one of success and failure of distribution of the distributable message at block 734, or in response to determining at decision point 732 that the MG API is asynchronous for the message generation request associated with the distributable message, the process 700 returns to decision point 702 and iterates as described above to process additional message generation requests.

As such, the process 700 receives requests to generate messages on behalf of applications from applications. This processing allows applications to disassociate themselves from conventional message generation processes (e.g., built-in routines and local resources). The request to generate messages on behalf of applications from applications may include message generation parameters, or default message generation parameters may be configured for applications, to improve run-time efficiency of the message generation service provided by the process 700. The message generation API may be specified as synchronous or asynchronous on a request-by-request basis.

FIG. 8 is a flow chart of an example of an implementation of a process 800 for application processing to utilize a generalized application message generation service. At decision point 802, the process 800 makes a determination at an application level associated with an application as to whether to initiate a message generation request to a message generation service (MGS) to generate and distribute a message on behalf of the application. In response to determining at the application level associated with the application to initiate a message generation request to a message generation service (MGS) to generate and distribute a message on behalf of the application, the process 800 makes a determination at decision point 804 as to whether to add message generation parameters to the message generation request or whether to utilize default message generation parameters. As described above, applications may utilize configured default message generation parameters to improve run-time efficiency. As also described above, the message generation parameters (whether specified by the application or configured defaults) may include an application identifier (ID), one or more natural language specifications/parameters for generation of the message in one or more natural languages, a message identifier (ID) specified by the application, or other message generation parameters as appropriate for a given implementation. The message generation parameters may further specify whether the message generation application programming interface (MG API) for the message generation request is to be synchronous or asynchronous on a request-by-request basis.

In response to determining to add message generation parameters to the message generation request, the process 800 adds message generation parameters to the message generation request at block 806. In response to adding the message generation parameters to the message generation request at block 806, or in response to determining to utilize configured default message generation parameters at decision point 804, the process 800 sends a message generation request to a message generation service (MGS) using a message generation application programming interface (MG API) at block 808.

At decision point 810, the process 800 makes a determination as to whether the message generation request is to be processed synchronously or asynchronously based upon the message generation parameters (specified or default). In response to determining that the message generation request is to be processed synchronously, the process 800 makes a determination at decision point 812 as to whether a message generation report has been received from the MGS. In response to determining that the message generation report has been received from the MGS, the process 800 logs the message generation report at block 814. In response to logging the message generation report at block 814, or in response to determining that the message generation request is to be processed asynchronously at decision point 810, the process 800 returns to decision point 800 and iterates as described above.

As such, the process 800 allows an application to issue message generation requests to a message generation service (MGS). This processing allows applications to disassociate themselves from conventional message generation processes (e.g., built-in routines and local resources). The request to generate messages on behalf of applications from applications may include message generation parameters, or default message generation parameters may be configured for applications, to improve run-time efficiency of the message generation service provided by the process 800. The message generation API may be specified as synchronous or asynchronous on a request-by-request basis.

As described above in association with FIG. 1 through FIG. 8, the example systems and processes provide a generalized application message generation service. Many other variations and additional activities associated with a generalized application message generation service are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving, via a message generation application programming interface (MG API) at a message generation service (MGS) device in response to an application-level reporting event associated with operation of an application, an application-initiated event reporting message generation request from the application, where the application-initiated event reporting message generation request comprises a request autonomously generated by the application for the MGS to generate an application-level event reporting message that specifies a criticality of the application-level reporting event on behalf of the application and further comprises an application-specified message identifier (ID) of a template message construct usable to generate the application-level event reporting message and application-selected message generation parameters passed by the application using the MG API;
    generating the application-level event reporting message on behalf of the application in accordance with the application-selected message generation parameters passed by the application using the MG API and a message file that comprises the template message construct identified by the application-specified message ID; and
    distributing the application-level event reporting message as requested on behalf of the application to a resource.

2. The method of claim 1, further comprising:
    determining at least one natural language specification for the application-level event reporting message from the application-selected message generation parameters passed by the application using the MG API;
    selecting the message file based upon the determined at least one natural language specification; and
    identifying the template message construct within the message file using the application-specified message ID, where the template message construct in the message file comprises at least one natural language-specific template message construct.

3. The method of claim 1, further comprising:
    extracting the application-selected message generation parameters passed by the application using the MG API from the application-initiated event reporting message generation request;
    identifying, as one of the extracted application-selected message generation parameters passed by the application using the MG API, the application-specified message ID of the template message construct; and
    associating, via the MGS, the application-specified message ID in the application-initiated event reporting message generation request with a message record in a message repository.

4. The method of claim 1, where:
    the MG API operates synchronously and the application waits for a response to the application-initiated event reporting message generation request via the MG API; and
    further comprising reporting to the application, via the MGS, one of success and failure of distribution of the application-level event reporting message generated and distributed on behalf of the application.

5. The method of claim 1, where the MG API operates asynchronously and the application does not wait for a response to the application-initiated event reporting message generation request via the MG API.

6. The method of claim 1, where:
    the application-selected message generation parameters passed by the application using the MG API comprise at least one substitution value comprising a distribution destination; and
    distributing the application-level event reporting message as requested on behalf of the application to the resource comprises distributing the application-level event reporting message as requested on behalf of the application to the distribution destination specified by the at least one substitution value.

7. The method of claim 1, where distributing the application-level event reporting message as requested on behalf of the application to the resource comprises distributing the application-level event reporting message as requested on behalf of the application to at least one of a local resource and a remote resource selected from a group consisting of a log file, a console, an event processing service, another application, and a mobile device.

8. A system, comprising:
- a memory; and
- a processor, operable at a message generation service (MGS), programmed to:
  - receive, via a message generation application programming interface (MG API) in response to an application-level reporting event associated with operation of an application, an application-initiated event reporting message generation request from the application, where the application-initiated event reporting message generation request comprises a request autonomously generated by the application for the MGS to generate an application-level event reporting message that specifies a criticality of the application-level reporting event on behalf of the application and further comprises an application-specified message identifier (ID) of a template message construct usable to generate the application-level event reporting message and application-selected message generation parameters passed by the application using the MG API;
  - generate, within the memory, the application-level event reporting message on behalf of the application in accordance with the application-selected message generation parameters passed by the application using the MG API and a message file that comprises the template message construct identified by the application-specified message ID; and
  - distribute the application-level event reporting message as requested on behalf of the application to a resource.

9. The system of claim 8, where the processor is further programmed to:
- determine at least one natural language specification for the application-level event reporting message from the application-selected message generation parameters passed by the application using the MG API;
- select the message file based upon the determined at least one natural language specification; and
- identify the template message construct within the message file using the application-selected message ID, where the template message construct in the message file comprises at least one natural language-specific template message construct.

10. The system of claim 8, where the processor is further programmed to:
- extract the application-selected message generation parameters passed by the application using the MG API from the application-initiated event reporting message generation request;
- identify, as one of the extracted application-selected message generation parameters passed by the application using the MG API, the application-specified message ID of the template message construct; and
- associate, via the MGS, the application-specified message ID in the application-initiated event reporting message generation request with a message record in a message repository.

11. The system of claim 8, where:
- the MG API operates synchronously and the application waits for a response to the application-initiated event reporting message generation request via the MG API; and
- the processor is further programmed to report to the application, via the MGS, one of success and failure of distribution of the application-level event reporting message generated and distributed on behalf of the application.

12. The system of claim 8, where:
- the application-selected message generation parameters passed by the application using the MG API comprise and at least one substitution value comprising a distribution destination; and
- in being programmed to distribute the application-level event reporting message as requested on behalf of the application to the resource, the processor is programmed to distribute the application-level event reporting message as requested on behalf of the application to the distribution destination specified by the at least one substitution value.

13. The system of claim 8, where in being programmed to distribute the application-level event reporting message as requested on behalf of the application to the resource, the processor is programmed to distribute the application-level event reporting message as requested on behalf of the application to at least one of a local resource and a remote resource selected from a group consisting of a log file, a console, an event processing service, another application, and a mobile device.

14. A computer program product, comprising:
- a non-transitory computer readable storage medium having computer readable program code embodied therewith, where the computer readable program code when executed on a computer causes the computer to:
  - receive, via a message generation application programming interface (MG API) at a message generation service (MGS) in response to an application-level reporting event associated with operation of an application, an application-initiated event reporting message generation request from the application, where the application-initiated event reporting message generation request comprises a request autonomously generated by the application for the MGS to generate an application-level event reporting message that specifies a criticality of the application-level reporting event on behalf of the application and further comprises an application-specified message identifier (ID) of a template message construct usable to generate the application-level event reporting message and application-selected message generation parameters passed by the application using the MG API;
  - generate the application-level event reporting message on behalf of the application in accordance with the application-selected message generation parameters passed by the application using the MG API and a message file that comprises the template message construct identified by the application-specified message ID; and
  - distribute the application-level event reporting message as requested on behalf of the application to a resource.

15. The computer program product of claim 14, where the computer readable program code when executed on the computer further causes the computer to:
- determine at least one natural language specification for the application-level event reporting message from the application-selected message generation parameters passed by the application using the MG API;
- select the message file based upon the determined at least one natural language specification; and
- identify the template message construct within the message file using the application-specified message ID, where the template message construct in the message file comprises natural language-specific template message construct.

16. The computer program product of claim 14, where the computer readable program code when executed on the computer further causes the computer to:
- extract the application-selected message generation parameters passed by the application using the MG API from the application-initiated event reporting message generation request;
- identify, as one of the extracted application-selected message generation parameters passed by the application using the MG API, the application-specified message ID of the template message construct; and
- associate, via the MGS, the application-specified message ID in the application-initiated event reporting message generation request with a message record in a message repository.

17. The computer program product of claim 14, where:
- the MG API operates synchronously and the application waits for a response to the application-initiated event reporting message generation request via the MG API; and
- the computer readable program code when executed on the computer further causes the computer to report to the application, via the MGS, one of success and failure of distribution of the application-level event reporting message generated and distributed on behalf of the application.

18. The computer program product of claim 14, where the MG API operates asynchronously and the application does not wait for a response to the application-initiated event reporting message generation request via the MG API.

19. The computer program product of claim 14, where:
- the application-selected message generation parameters passed by the application using the MG API comprise at least one substitution value comprising a distribution destination; and
- in causing the computer to distribute the application-level event reporting message as requested on behalf of the application to the resource, the computer readable program code when executed on the computer causes the computer to distribute the application-level event reporting message as requested on behalf of the application to the distribution destination specified by the at least one substitution value.

20. The computer program product of claim 14, where in causing the computer to distribute the application-level event reporting message as requested on behalf of the application to the resource, the computer readable program code when executed on the computer causes the computer to distribute the application-level event reporting message as requested on behalf of the application to at least one of a local resource and a remote resource selected from a group consisting of a log file, a console, an event processing service, another application, and a mobile device.

\* \* \* \* \*